United States Patent [19]

Watkins

[11] Patent Number: 5,153,007

[45] Date of Patent: Oct. 6, 1992

[54] ROTARY INJECTION MOLDING PRESS

[75] Inventor: Michael J. Watkins, Aurora, Ill.

[73] Assignee: Illinois Precision Corporation, Wheaton, Ill.

[21] Appl. No.: 706,975

[22] Filed: May 29, 1991

[51] Int. Cl.$^5$ ............................................. B29C 45/78
[52] U.S. Cl. .................................. 425/143; 264/40.6; 425/144; 425/407; 425/409; 425/418; 425/540
[58] Field of Search ............... 425/143, 144, 540, 407, 425/409, 418; 264/40.6

[56] References Cited

U.S. PATENT DOCUMENTS

| | | | |
|---|---|---|---|
| 2,518,594 | 8/1950 | Blanchard | 425/185 |
| 2,803,853 | 8/1957 | Brazier | 425/547 |
| 3,293,691 | 12/1966 | Osgood | 425/145 |
| 3,407,443 | 10/1968 | Beebee et al. | 425/547 |
| 3,568,247 | 3/1971 | Lunn | 425/129.1 |
| 4,547,140 | 10/1985 | Davis | 425/138 |
| 4,801,260 | 1/1989 | Oles et al. | 425/592 |

Primary Examiner—Tim Heitbrink
Attorney, Agent, or Firm—Welsh & Katz, Ltd.

[57] ABSTRACT

A rotary injection molding press having a rotatable platform with a plurality of mold blocks is disclosed, wherein a controller box containing individual temperature control units is mounted on the rotatable platform so as to reliably maintain independent temperature control of each mold block. The controller box includes a rotary coupler for providing a rotating electrical connection from the stationary frame to the controller box, wherein the rotary coupler comprises pairs of wetted electrodes connected through separated pools of mercury. Using this configuration, a highly reliable rotating connection is provided which is substantially frictionless and has a consistently low resistance. Furthermore, by locating the individual temperature control units in a single controller box positioned on the rotatable platform itself, the problem of routing the sensitive control loop signals through a rotating electrical connection is avoided.

19 Claims, 3 Drawing Sheets

ROTARY INJECTION MOLDING PRESS

CROSS-REFERENCE TO RELATED APPLICATIONS

This application contains subject matter related to U.S. Pat. No. 4,547,140, which is incorporated herein by reference.

BACKGROUND OF THE INVENTION

This invention generally relates to the field of injection molding presses, and more particularly relates to rotary injection molding presses which inject fluid plastic into a series of individual mold blocks positioned in a circle on a rotatable platform.

Injection molding is typically used for molding small plastic articles, and is often used where a component, such as an electrical connector, is molded therein. In a rotary injection molding press, a series of mold blocks are mounted in a circle on a rotatable platform or table. An injection mechanism is fed with solid plastic, usually in pellet form. The injection mechanism includes heating or cooling elements for heating or cooling the plastic into a semi-fluid state, and a reciprocating screw element to force the semi-fluid plastic under pressure through an injector nozzle into the cavity of a properly-positioned mold block. Each of the mold blocks is typically constructed to have a bottom or base portion secured to the rotatable platform, and a hinged top portion which can be opened to remove the molded plastic article from the molding cavity. Heat is provided during the molding operation by electrical resistance heating.

During the first step of the injection molding operation, an opened mold block is positioned into a preparation station, wherein the electrical connectors or other components are inserted into the heated mold block and the mold block is closed. Next, the closed mold block is positioned into the injection station, wherein the reciprocating screw is engaged and the mold block is injected with semi-fluid plastic. After a particular mold block has been injected, the rotatable platform is indexed to position the next block under the injection mechanism. As the platform is rotated in this indexing fashion, the previous mold block is positioned into a curing station, wherein the fluid plastic within the mold cavity is allowed to heat and harden to form the desired plastic article. Next, the platform is indexed to an eject station, wherein the molded plastic article is removed from the mold block. This indexed rotation of the mold blocks on the rotatable platform continues, thus resembling a circular assembly line for molding plastic articles.

One of the more common problems associated with rotary injection molding is that of how to control the temperature of the mold blocks, particularly if thermoset plastic is used. If the temperature of the mold does not reach the required temperature for properly curing a thermoset plastic, the plastic article will crumble. On the other hand, if the temperature of the mold rises above the recommended maximum temperature for curing the particular thermoset plastic used, then the plastic will burn and the article will be discolored and/or weakened. More specifically, if a type SE 851/852 or SE 871 silicone rubber thermoset compound manufactured by General Electric under the trade name TUFEL ® is used for injection molding of small articles, the manufacturer recommends that the temperature tolerance of the molds for a one-minute cure time be ±3° C. for proper curing. Hence, accurate temperature control must be maintained within the molding blocks throughout the molding operation.

Although independent control of the temperature of each of the mold blocks individually is not necessarily a requirement for many applications, independent temperature control of each of the mold blocks provides for a higher level of quality control over the operation. Individual temperature control also permits the molding of different articles requiring different molding temperatures on the same rotatable platform.

In order to provide individual temperature control of each mold, some type of temperature monitoring device must be affixed to each of the individual mold blocks. Either thermocouples, each having two wire leads, or resistance temperature devices (RTDs), each having two or three wire leads, must be connected to the temperature control unit. For example, if there are six mold blocks on the rotatable platform, then at least a dozen wire leads from the temperature monitoring devices must be routed to the temperature control unit. Furthermore, the outputs of the temperature control unit must also be connected to the individual mold blocks to independently control the temperatures. That is, the individual electric heater cartridges, each having two wire leads, also require connection to the temperature control unit. Thus, the temperature control unit would require at least twenty-four individual wire leads for a rotatable platform having six mold blocks.

Typically, the temperature control unit is located next to the injection mechanism on the stationary frame of the injection molding press. If this configuration is used, some type of rotary electrical coupler must be used to supply electrical connection to the heater cartridges and the thermocouples. In the past, brushes and slip-rings have been used to provide these electrical connections. For example, the slip rings would surround a post extending upwardly along the axis of the rotatable platform, such that a number of brushes would contact each slip-ring.

There are several drawbacks inherent in this approach. First, brushes and slip-rings are subject to wear and oxidation, such that electrical intermittence often occurs. If the intermittence is located in the feedback control loop of the temperature control unit, i.e., in series with the thermocouple, then accurate temperature control is very difficult to maintain. Similarly, if the intermittence is located in the high-current heater circuit, then arcing and burning of the contacts inherently occurs, thus reducing the life of the contacts and increasing their resistance. Numerous safety issues are also involved if the high voltage contacts are left out in the open. Still further, the use of numerous slip-ring contacts, i.e., twenty-four contacts in the previous example, is very expensive and complex to construct, and even more costly and difficult to maintain.

A need, therefore, exists for a reliable and cost effective way to provide individual temperature control for the individual mold blocks of a rotary injection molding press.

SUMMARY OF THE INVENTION

Accordingly, it is a general object of the present invention to provide an improved rotary injection molding press having independent temperature control of a number of mold blocks on the rotatable platform.

A more particular object of the present invention is to provide an improved mechanism for coupling the wire leads, which are used for the individual temperature control of the mold blocks, from the rotatable platform to the stationary frame of the injection molding press.

In accordance with the present invention, a rotary injection molding press is provided which reliably maintains independent temperature control of a plurality of mold blocks. The rotary injection molding press includes: a stationary frame; a rotatable platform disposed on the stationary frame, the rotatable platform including a motor mechanism for rotating the platform around a central axis; a plurality of mold blocks located on the platform and arranged substantially in a circle centered on the axis of rotation of the platform, each of the mold blocks including heating elements for individually heating the mold blocks, and further including a monitoring device for individually monitoring the temperature of the mold blocks and thereby providing a control signal; and a controller box for controlling the heating element in response to the temperature signal provided by the temperature monitoring device, wherein the controller box is affixed to the rotatable platform, and wherein the controller box includes a rotary coupler for providing a rotating electrical connection from the stationary frame to the controller box, the rotary coupler including a plurality of pairs of internal wetted electrodes connected through separate pools of conductive liquid.

In the preferred embodiment, a particular type of rotary electrical coupler is used for providing a highly reliable rotating connection which is substantially frictionless and has a consistently low resistance. The rotary coupler comprises pairs of wetted electrodes connected through separated pools of mercury. The coupler housing is constructed of corrosion-resistant materials, and the housing sections rotate on ball bearings. The electrical connections are completely enclosed within the housing. Three-phase AC voltage is routed through the rotary coupler to individual temperature control units within the controller box. A fourth conductor of the rotary electrical coupler is used for switched AC voltage to the temperature control units, such that they may monitor the temperature of the mold blocks without requiring the individual heater cartridges to be turned on.

In this manner, the temperature of each mold block of the rotary injection molding press may be monitored and controlled individually. In using the mercury-wetted rotary electrical coupler, the reliability and longevity of the connections are enhanced. Furthermore, by locating the individual temperature control units in a single controller box positioned on the rotatable platform itself, the problem of routing the sensitive control loop signals through a rotating electrical connection is avoided.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DETAILED DESCRIPTION OF THE PREFERRED EMBODIMENT

Figure 1:
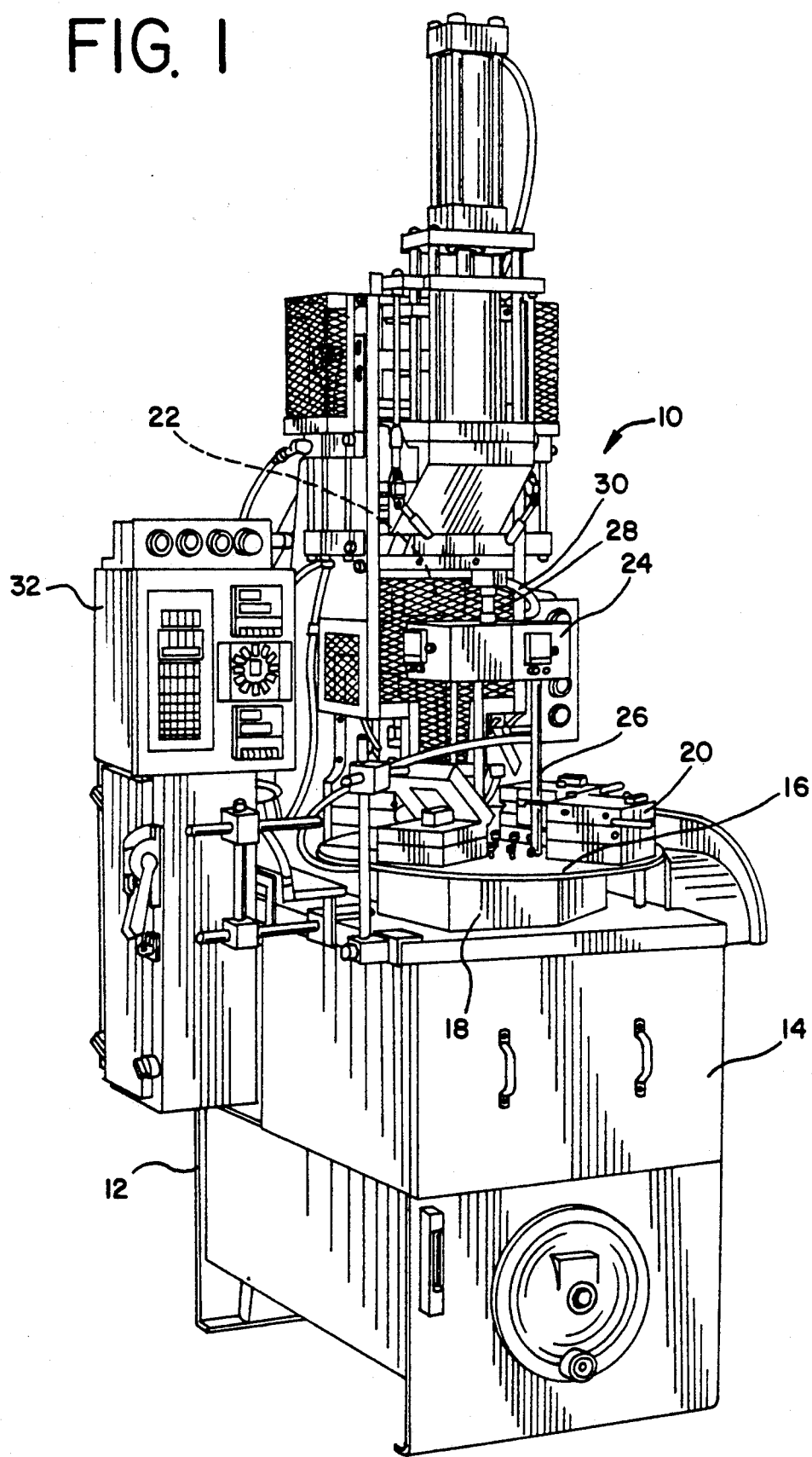
FIG. 1 is a perspective front view of the improved rotary injection molding press of the present invention.

Referring now to the accompanying drawings, FIG. 1 shows a perspective front view of a rotary injection molding press 10 of the present invention. The press 10 includes an upstanding frame 12, a portion of which includes a lower cabinet 14 which houses the hydraulics and some of the electronics of the press 10.

A circular rotatable platform 16 is horizontally disposed on the press as shown. The platform 16 includes one or more mold blocks 20, only four of which are shown in FIG. 1. An indexing motor 18, positioned under the platform 16, provides for counterclockwise rotation of the platform 16 in a controlled manner. As the platform 16 rotates in an indexed fashion, each of the individual mold blocks 20 are positioned under an injector mechanism 22 to inject a particular mold block 20 with plastic. The rotatable platform then transports each mold block 20 through the several stations of the press described above. Refer to U.S. Pat. No. 4,547,140, for further details of the injection molding operation, the disclosure of which is incorporated herein by reference.

Also disposed on the platform 16 is a controller box 24. The controller box 24 is mounted to the top surface of the platform 16 on three vertical legs 26 as shown. The controller box 24 includes the individual temperature control units for each of the mold blocks as will be described in detail below.

Since the controller box 24 rotates with the platform 16 during the operation of the injection molding press, a rotary electrical coupler 28 is provided at the top and center of the controller box 24. The rotary coupler 28 is disposed along the central axis of the rotation of the platform 16 and the controller box 24, such that a wire cable 30 extending from the controller box is maintained in a stationary position. The cable 30 is routed from the rotary coupler 28 to the stationary operating control panel 32 affixed to the frame 12.

Figure 2:
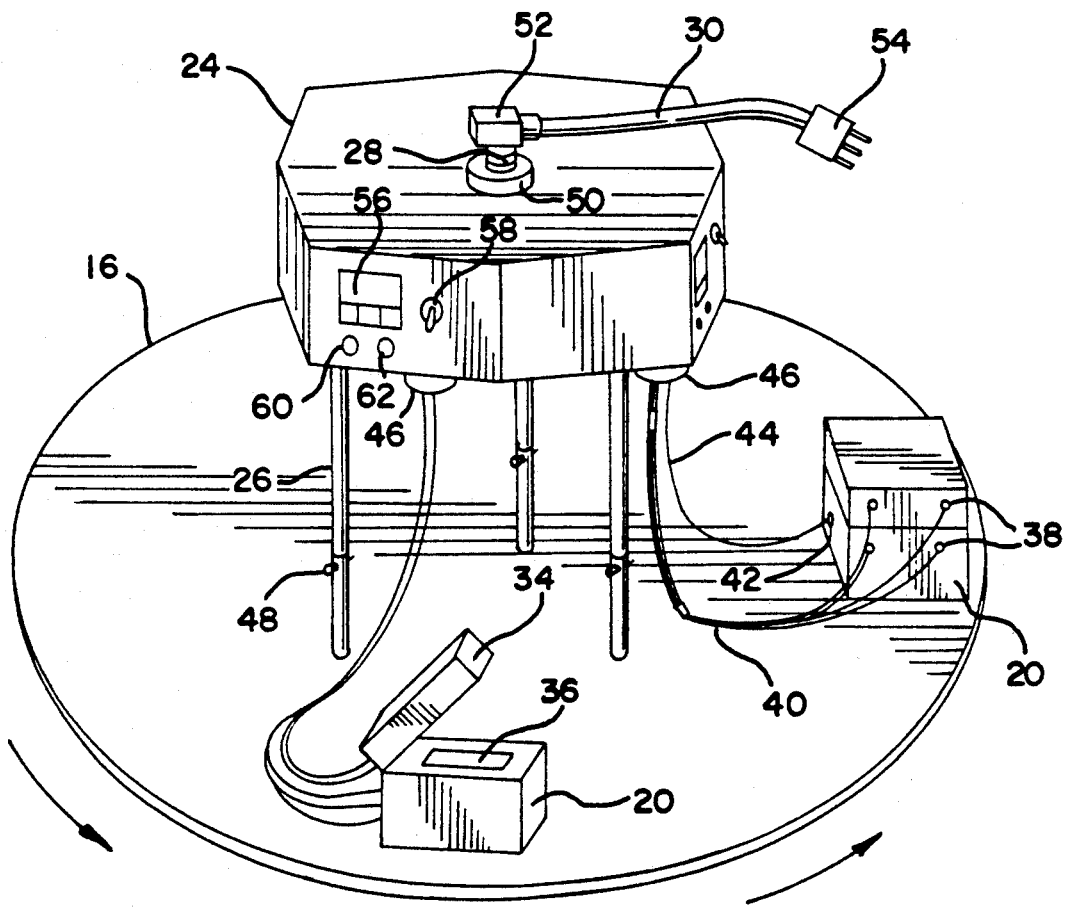
FIG. 2 is a partial perspective front view of the molding press illustrating the rotatable platform, two mold blocks, and the controller box.

FIG. 2 illustrates a partial perspective view of the controller box 24, wherein only two mold blocks 20 are shown as being mounted on the rotatable platform 16. Each mold block 20 has a bottom portion which is secured to the platform 16, and a top portion 34 which is hinged to the bottom portion to allow for a pivoting opening and closing movement. A mold cavity 36, which is adapted to be filled with fluid plastic and form the desired finished plastic article, is disposed in one or both portions of the mold block.

A number of electrical heater cartridges 38, located within apertures in the mold block, are used for individually heating each mold block. In the preferred embodiment, two electrical heater cartridges are positioned in each portion of the mold block 20 as shown. The wire leads 40 for the heater cartridges 38 are routed into the controller box 24 via a number of plug connectors 46.

At least one temperature monitoring device, such as a thermocouple 42, is also positioned within the mold block 20. The temperature monitoring device also has a number of wire leads 44 which are connected to the controller box 24 using the plug connectors 46. If a copper-constantan thermocouple is used, only two wires need to be connected to the controller box. If a resistance temperature device, such as a resistance bulb, is used, then three or four wires may have to be connected to the controller box. In any event, numerous wire leads 40, 44 are connected from each mold block 20 and terminate in at least one plug connector 46 attached to the underside of the controller box 24, such that the mold blocks can be individually removed from the press.

The controller box 24 itself is securely affixed to the top of the platform 16 via the three vertical legs 26. In the preferred embodiment, each leg is separable into an upper and lower section, and the upper and lower leg sections are connected together using a removable clip pin 48. Hence, by removing the three clip pins 48 and disconnecting the plug connectors 46, the controller box 24 can be readily removed from the platform 16 for maintenance or setup.

The rotary electrical coupler 28 is positioned on the top of the controller box 24 as shown, such that its axis of rotation corresponds to that of the rotatable platform 16. A bushing 50 is used to securely fasten the bottom half of the rotary coupler's housing to the top of the controller box 24, thus making the bottom half of the coupler housing rotate with the platform. The top half of the rotary coupler housing includes a number of electrical terminals connected to the cable 30 within a terminal housing 52. The other end of the wire cable 30 includes a plug connector 54.

A number of individual temperature control units are enclosed within the controller box 24. In the preferred embodiment, each temperature control unit includes a seven segment display 56. The circuitry for controlling each mold block also includes an on/off switch 58, and a pair of fuses 60, 62.

Figure 3:
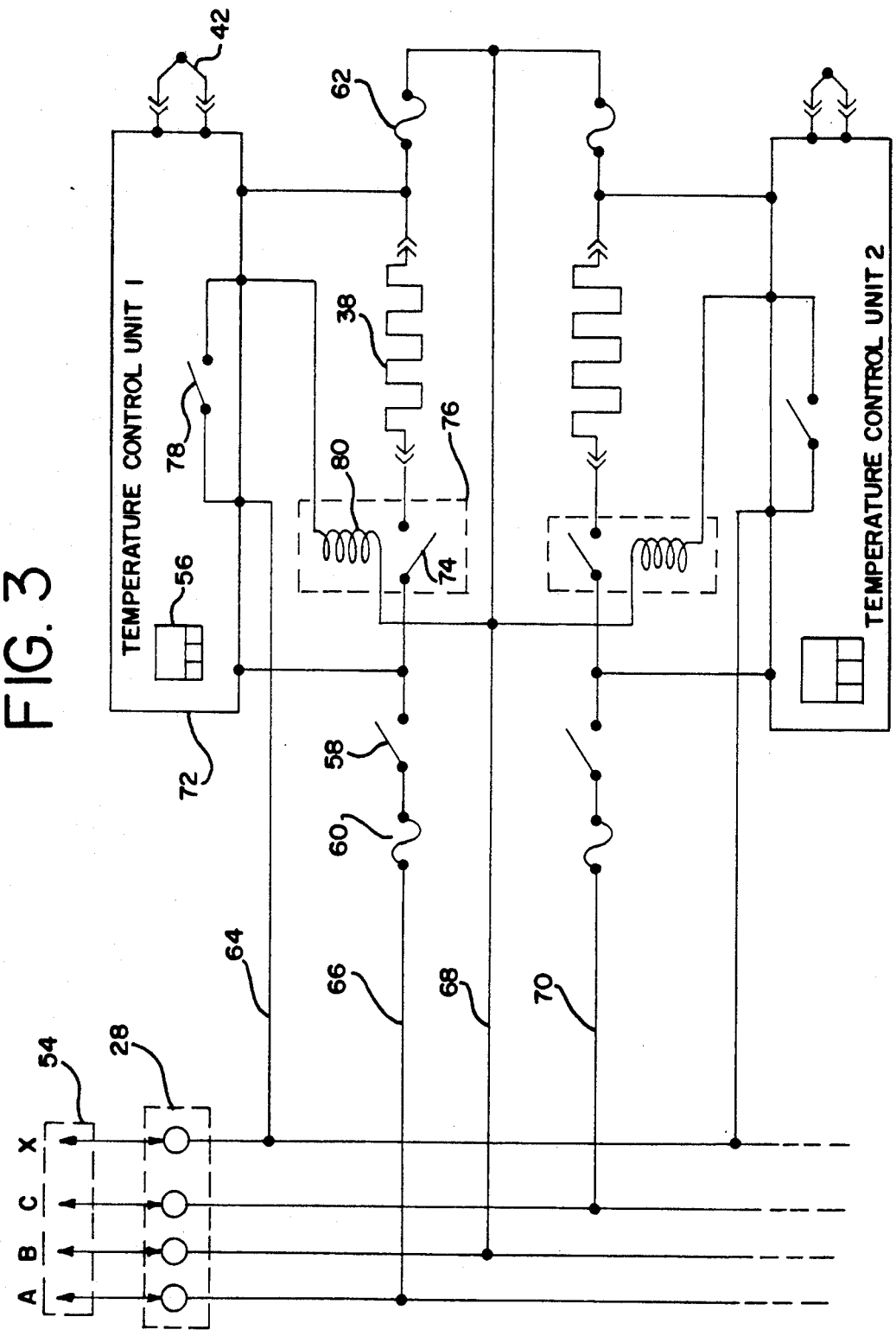
FIG. 3 is a partial schematic block diagram of the controller box of FIG. 2.

FIG. 3 is a partial schematic diagram for the controller box 24. Three-phase 240 volt AC power is applied to terminals A, B, C, of the plug connector 54. A switched 240 VAC voltage is applied to the X terminal of plug connector 54. These four wires are routed via individual pairs of internal electrodes within the rotary coupler 28, each connected through separate pools of conductive liquid, to the inside of the controller box 24. In the preferred embodiment, a six-conductor mercury-wetted rotary electrical connector is used for coupler 28. (Two conductors are not used.) Such a rotary coupler is available as Model 630 from Mercotac, Inc. of San Diego, Calif. The Model 630 rotary coupler has four conductors rated at 30 amps at 240 VAC, two conductors rated at 5 amps at 240 VAC, and a maximum series resistance of 10 milliohms.

As illustrated, FIG. 3 represents the circuitry for only two individual mold blocks, wherein identical circuitry would be repeated for the remaining two or four mold blocks. Moreover, the circuitry of only the first mold block will be described herein, since the first and second mold blocks have similar connections except that they each use different power connections to the three-phase AC power. As shown in the figure, the first mold block obtains power from terminals A-B via lines 66, 68, while the second mold block is powered from terminals B-C via lines 70, 68. Three-phase 240 volt AC is used the present embodiment to reduce the current requirements through the rotary coupler 28.

For the first mold block, power is coupled from terminal A of plug connector 54 via line 66 through fuse 60 and on/off switch 58, and then applied to a first temperature control unit 72. In the preferred embodiment, the temperature control units are the Model 91 PID-ON/OFF temperature controllers available from Eurotherm Corporation, of Ruston, Va., each having front panel controls on the display 56. The same power is applied through the contacts 74 of a high current relay or solid state switch 76 to the electric heating element 38. In the preferred embodiment, the relay 76 is a type A2425 solid state relay, available from Crydom Co., El Segundo, Calif., having a maximum load current rating of 25 amps RMS. If multiple heater cartridges are used, as in the preferred embodiment, then heater element 38 would represent the parallel combination of all the heater cartridges.

Power from terminal B of the three-phase power is applied via line 68, through fuse 62, to the other terminal of the temperature control unit 72, and the heating element 38. The switched AC voltage available at terminal X of the plug connector 54 is routed through line 64 to the temperature control unit 72. A temperature control unit typically has a pair of normally-open output contacts 78, which are configured to apply the switched AC power to the trigger terminal or relay coil 80 of relay 76 as shown. The other terminal of the relay coil is connected to line 68. The temperature measuring device or thermocouple 42 is also connected to temperature control unit 72.

In operation, three-phase AC power is always applied to terminals A, B, and C. The operator first turns on/off switch 58 to the on position, and sets a desired temperature using the control panel portion of display 56. If the temperature of the first mold block, as measured by thermocouple 42, is below that which is set on the display and control panel 56, then the temperature control unit 72 closes its output contacts 78 such that power is applied through relay coil 80. The high current contacts 74 of relay 76 are then closed in order to apply 240 VAC to the heater element 38.

As the temperature of the mold block rises, the thermocouple 42 provides this temperature information to the temperature control unit 72, and output contacts 78 are opened when a desired temperature is reached. This causes relay coil 80 to disengage contacts 74, thereby removing power from the heater element 38. As the mold block cools below the desired temperature, the reverse procedure occurs. In this manner, the temperature control unit 72 maintains a constant temperature for the first mold bock. Similarly, the remaining mold blocks are controlled buy their individual temperature control units. Note that since a switched AC voltage X is used to power the output contacts 78, and since an unswitched AC voltage A is used to power the temperature control unit 72, the temperature of the mold blocks can be monitored on the display 56 without requiring the individual heater cartridges to be turned on.

In review, it can now be seen that the present invention provides a reliable and cost effective way to provide individual temperature control for the individual mold blocks of a rotary injection molding press. By locating the individual temperature control units in a single controller box positioned on the rotatable platform itself, the problem of routing the sensitive control loop signals through a rotating electrical connection is avoided. Furthermore, the temperature of each mold block of the rotary injection molding press may be monitored and controlled individually. In using a rotary coupler having pairs of wetted electrodes connected through separated pools of mercury, the preferred embodiment provides a highly reliable rotating connection which is substantially frictionless and has a consistently low resistance.

While specific embodiments of the present invention have been shown and described herein, further modifications and improvements may be made by those skilled in the art. All such modifications which retain the basic underlying principles disclosed and claimed herein are within the scope of this invention.

What is claimed is:

1. A rotary molding machine comprising:
   a stationary frame;
   a rotatable platform disposed on said stationary frame, said rotatable platform including means for rotating said platform around a central axis;
   a plurality of mold blocks located on said platform, each of said mold blocks including means for individually heating said mold blocks, and further including means for individually monitoring the temperature of said mold blocks and thereby providing a control signal; and
   controlling means for controlling said heating means in response to said control signal provided by said temperature monitoring means, said controlling means affixed to said rotatable platform, said controlling means including rotary coupler means for providing a rotating electrical connection from said stationary frame to said controlling means, said rotary coupler means including a plurality of pairs of internal wetted electrodes connected through separate pools of conductive liquid.

2. The rotary molding machine according to claim 1, wherein said conductive liquid is at least partially comprised of mercury.

3. The rotary molding machine according to claim 1, wherein said wetted electrodes of said rotary coupler means are completely enclosed within a housing.

4. The rotary molding machine according to claim 1, wherein said rotary coupler means is adapted for use with 240 volts AC.

5. The rotary molding machine according to claim 1, wherein said rotary coupler means has four conductors extending therethrough, three of said conductors supplying three-phase AC voltage to said controlling means, and the remaining conductor supplying a control voltage to said controlling means.

6. The rotary molding machine according to claim 1, wherein said rotary coupler means has no exposed contacts.

7. The rotary molding machine according to claim 1, wherein said rotary coupler means includes at least three pairs of separate electrodes.

8. The rotary molding machine according to claim 1, wherein said rotary coupler means includes two separate housing portions which rotate on ball bearings.

9. The rotary molding machine according to claim 1, wherein said rotary coupler means is positioned to rotate about said central axis of said rotatable platform.

10. The rotary molding machine according to claim 1, wherein said controlling means is positioned above said rotatable platform on a plurality of vertical legs.

11. The rotary molding machine according to claim 10, wherein said vertical legs are separable such that said controlling means can readily be removed from said rotatable platform.

12. The rotary molding machine according to claim 1, wherein said rotatable platform includes at least four mold blocks arranged substantially circumferentially in a circle centered on said central axis of said platform.

13. The rotary molding machine according to claim 1, wherein said temperature monitoring means is a thermocouple.

14. The rotary molding machine according to claim 1, wherein said controlling means includes a plurality of individual temperature control unit modules, one corresponding to each of said plurality of mold blocks.

15. The rotary molding machine according to claim 1, wherein said heating means comprises a plurality of electric heater cartridges.

16. The rotary molding machine according to claim 15, wherein said heater cartridges and said monitoring means are separately wired to said controlling means.

17. The rotary molding machine according to claim 15, wherein each of said plurality of mold blocks includes an upper portion which is at least partially separable from a lower portion of said block, and wherein each of said portions includes at least two electric heating cartridges.

18. The rotary molding machine according to claim 1, wherein said controlling means monitors the temperature of said mold blocks without having power applied to the heater means.

19. A rotary injection molding press comprising:
    a stationary frame having a source of electrical power;
    a rotatable platform disposed horizontally on said stationary frame, said rotatable platform including means for rotating said platform around a central vertical axis;
    a plurality of mold blocks located on said platform and arranged substantially in a circle centered on said vertical axis, each of said mold blocks including a plurality of electric heating cartridges and at least one thermocouple;
    a controller box positioned above and removably mounted to said rotatable platform on vertical legs, said controller box including a number of individual temperature control units corresponding to the number of mold blocks, each temperature control unit connected to the heating cartridges and thermocouples of a particular mold block, said controller box supplying electrical power to said temperature control units; and
    a rotary connector positioned above and partially affixed to said controller box to rotate about said vertical axis, said rotary connector including at least three pairs of internal wetted electrodes connected through separate pools of liquid mercury, said rotary connector providing a rotating electrical power connection for coupling the electrical power from said stationary frame power source to said controller box.

* * * * *